United States Patent
Miyamoto et al.

(10) Patent No.: US 10,605,108 B2
(45) Date of Patent: Mar. 31, 2020

(54) OPTICAL FIBER PROBE, OPTICAL FIBER MEASURING DEVICE, AND CLEARANCE CONTROL SYSTEM

(71) Applicant: Mitsubishi Hitachi Power Systems, Ltd., Kanagawa (JP)

(72) Inventors: Takahiro Miyamoto, Tokyo (JP); Akio Kondou, Tokyo (JP); Tomoyuki Onishi, Tokyo (JP); Katsuhisa Hamada, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 263 days.

(21) Appl. No.: 15/757,836

(22) PCT Filed: Jun. 29, 2016

(86) PCT No.: PCT/JP2016/069278
§ 371 (c)(1),
(2) Date: Mar. 6, 2018

(87) PCT Pub. No.: WO2017/043157
PCT Pub. Date: Mar. 16, 2017

(65) Prior Publication Data
US 2018/0340441 A1    Nov. 29, 2018

(30) Foreign Application Priority Data

Sep. 10, 2015 (JP) ................................ 2015-178656

(51) Int. Cl.
*F01D 11/20* (2006.01)
*G01B 11/14* (2006.01)
(Continued)

(52) U.S. Cl.
CPC .............. *F01D 11/20* (2013.01); *F01D 11/22* (2013.01); *F01D 21/003* (2013.01); *G01B 11/14* (2013.01);
(Continued)

(58) Field of Classification Search
CPC ........ F01D 11/20; F01D 11/22; F01D 21/003; G01B 11/14
See application file for complete search history.

(56) References Cited

U.S. PATENT DOCUMENTS 4,804,905 A * 2/1989 Ding .................... F01D 21/04
174/152 GM
5,266,797 A   11/1993 Zuefferey
(Continued)

FOREIGN PATENT DOCUMENTS

CN    104501728    4/2015
EP    0 874 950    11/1998
(Continued)

OTHER PUBLICATIONS

Written Opinion of the International Searching Authority dated Sep. 20, 2016 in International Application (PCT) No. PCT/JP2016/069278, with English-language translation.
(Continued)

*Primary Examiner* — Woody A Lee, Jr.
(74) *Attorney, Agent, or Firm* — Wenderoth, Lind & Ponack, L.L.P.

(57) ABSTRACT

An optical fiber probe includes a probe body, an optical fiber, and a position regulating member. The probe body has a first bottom plate with an outer surface, a second bottom plate opposite to the first bottom, and an internal space. The optical fiber is housed in the internal space. The position regulating member is attached to the probe body. The optical fiber includes a small-diameter portion and a large-diameter
(Continued)

portion. The first bottom plate has an inner surface in the internal space and a through hole for communicating the outer surface and the inner surface. The small-diameter portion is inserted into the through hole. The large-diameter portion is arranged such that a first end face thereof is in contact with the inner surface while being bent by the position regulating member in contact with a second end face thereof.

14 Claims, 7 Drawing Sheets

(51) Int. Cl.
*F01D 11/22* (2006.01)
*F01D 21/00* (2006.01)

(52) U.S. Cl.
CPC ...... *F05D 2220/31* (2013.01); *F05D 2220/32* (2013.01); *F05D 2270/804* (2013.01)

(56) References Cited

U.S. PATENT DOCUMENTS

| | | | |
|---|---|---|---|
| 8,042,412 B2 | 10/2011 | Xia et al. | |
| 2005/0286995 A1* | 12/2005 | Shang | F01D 11/06 415/1 |
| 2006/0140754 A1* | 6/2006 | Tanioka | F01D 11/24 415/173.1 |
| 2006/0239813 A1* | 10/2006 | Shah | F01D 11/08 415/119 |
| 2010/0191502 A1 | 7/2010 | Ren et al. | |
| 2012/0128303 A1 | 5/2012 | Koyama et al. | |
| 2012/0136211 A1 | 5/2012 | Komukai et al. | |
| 2012/0156007 A1* | 6/2012 | Bacic | F01D 11/20 415/126 |
| 2012/0182563 A1 | 7/2012 | Kominsky | |
| 2018/0058249 A1* | 3/2018 | Reigl | F01D 17/145 |

FOREIGN PATENT DOCUMENTS

| | | | |
|---|---|---|---|
| EP | 2169345 A1 * | 3/2010 | ............... G01B 7/14 |
| JP | 6-50743 | 2/1994 | |
| JP | 06-043605 | 6/1994 | |
| JP | 2000-503769 | 3/2000 | |
| JP | 2002-156556 | 5/2002 | |
| JP | 2007-271993 | 10/2007 | |
| JP | 2010-008409 | 1/2010 | |
| JP | 2010-175542 | 8/2010 | |
| JP | 2012-125551 | 7/2012 | |
| JP | 2013-250209 | 12/2013 | |
| WO | WO-9726444 A2 * | 7/1997 | ............. F01D 21/04 |
| WO | 2011/018996 | 2/2011 | |
| WO | WO-2011018996 A1 * | 2/2011 | ........... G02B 6/3846 |

OTHER PUBLICATIONS

Notice of Reasons for Refusal dated Sep. 3, 2019, in corresponding Japanese Patent Application No. 2015-178656 with Machine Translation.

* cited by examiner

OPTICAL FIBER PROBE, OPTICAL FIBER MEASURING DEVICE, AND CLEARANCE CONTROL SYSTEM

FIELD

The present invention relates to an optical fiber probe that is a probe using an optical fiber, an optical fiber measuring device, and a clearance control system.

BACKGROUND

Conventionally, as an optical fiber probe, there is known a reflection probe having a 6x1 fiber configuration (see, for example, Patent Literature 1). This reflection probe includes a central fiber and six coaxial fibers.

CITATION LIST

Patent Literature

Patent Literature 1: Japanese Patent Application Laid-open No. 2010-8409

SUMMARY

Technical Problem

There is a case where, for example, an optical fiber probe such as a reflection probe is provided in a turbine such as a steam turbine or a gas turbine. In this case, the optical fiber probe is exposed to a high-temperature and high-pressure environment. When the optical fiber probe is used in a harsh external environment, there is a possibility that an optical fiber is dented from a surface for detection or a portion of a ceramic sealing member for fixing the optical fiber is damaged. In this manner, when the optical fiber probe is used in a harsh external environment, there is a possibility that the position or the shape of an optical fiber is changed and detection accuracy using the optical fiber probe is lowered.

Therefore, an object of the present invention is to provide an optical fiber probe, an optical fiber measuring device, and a clearance control system that can suppress a change of an optical fiber caused by an external environment and can suppress lowering of detection accuracy.

Solution to Problem

An optical fiber probe according to the present invention includes a probe body having a surface for detection provided in an outer surface thereof and an internal space formed therein; an optical fiber housed in the internal space such that a front-end portion thereof is provided closer to the surface for detection of the probe body; and a position regulating member attached to the probe body. The optical fiber includes a small-diameter portion having a smaller diameter on a front-end side and a large-diameter portion having a larger diameter on a rear-end side of the small-diameter portion. The probe body has a bottom surface provided on an opposite side to the surface for detection in the internal space, and a through hole for communicating the surface for detection and the bottom surface. The small-diameter portion is inserted into the through hole. The large-diameter portion is arranged such that a front-end portion thereof is in contact with the bottom surface while being bent in the internal space. The position regulating member is provided to contact a rear-end portion of the large-diameter portion, and regulates a position of the optical fiber with the large-diameter portion being bent.

According to this configuration, a large-diameter portion of an optical fiber can be pressed against a bottom surface of an internal space by being bent. Therefore, even in a case where the external environment is a high-temperature and high-pressure environment, it is possible to suppress a small-diameter portion of the optical fiber from denting from a surface for detection of a probe body. Further, a sealing member for fixing the optical fiber to the probe body can be omitted, and thus damage of the sealing member is not caused. Accordingly, a change of the optical fiber caused by the external environment can be suppressed, so that lowering of detection accuracy can be suppressed.

Another optical fiber probe according to the present invention includes a probe body having a surface for detection provided in an outer surface thereof and an internal space formed therein; an optical fiber housed in the internal space such that a front-end portion thereof is provided closer to the surface for detection of the probe body; a position regulating member attached to the probe body; and an elastic member for pressing the optical fiber toward the surface for detection. The optical fiber includes a small-diameter portion having a smaller diameter on a front-end side and a large-diameter portion having a larger diameter on a rear-end side of the small-diameter portion. The probe body has a bottom surface provided on an opposite side to the surface for detection in the internal space, and a through hole for communicating the surface for detection and the bottom surface. The small-diameter portion is inserted into the through hole. The large-diameter portion is arranged such that a front-end portion thereof is in contact with the bottom surface. The position regulating member is spaced from a rear-end portion of the large-diameter portion with a gap. The elastic member is provided in the gap between the rear-end portion of the large-diameter portion and the position regulating member.

According to this configuration, an elastic member is provided between a rear-end portion of a large-diameter portion of an optical fiber and a position regulating member, thereby enabling the elastic member to press the optical fiber toward a surface for detection. Therefore, it is possible to press the large-diameter portion against a bottom surface of an internal space. Accordingly, even in a case where the external environment is a high-temperature and high-pressure environment, it is possible to suppress a small-diameter portion of the optical fiber from denting from a surface for detection of a probe body. Further, a sealing member for fixing the optical fiber to the probe body can be omitted, and thus damage of the sealing member is not caused. Accordingly, a change of the optical fiber caused by the external environment can be suppressed, so that lowering of detection accuracy can be suppressed.

Preferably, the optical fiber includes a core as being a central portion and a cladding provided around the core; the core has a same diameter in the large-diameter portion and in the small-diameter portion; and the cladding has a larger outer diameter in the large-diameter portion than in the small-diameter portion.

According to this configuration, it suffices that an outer diameter of a cladding is made thick in a large-diameter portion without changing the diameter of a core. Therefore, it is possible to maintain an interface between the core and the cladding in a uniform state.

Preferably, further included is an optical window inserted into the through hole such that the optical window is closer to the surface for detection.

According to this configuration, it is possible to partition outside of a probe body and an internal space of the probe body by an optical window. Therefore, an optical fiber is not exposed to the outside of the probe body, and can be housed in the internal space. Accordingly, it is possible to suppress exposure of the optical fiber to the external environment.

Preferably, the optical window has a columnar shape that is long in an axial direction that is an insertion direction of the through hole; and an outer circumferential surface of the optical window is plated.

According to this configuration, it is possible to reflect light passing through an optical window. Therefore, it is possible to suppress lowering of intensity of the light passing through the optical window.

Still another optical fiber probe according to the present invention includes a probe body having a surface for detection provided in an outer surface thereof and an internal space formed therein; an optical fiber housed in the internal space such that a front-end portion thereof is provided closer to the surface for detection of the probe body; and an optical window attached to the probe body. The probe body has a bottom surface provided on an opposite side to the surface for detection in the internal space, and a through hole for communicating the surface for detection and the bottom surface. The front-end portion of the optical fiber is inserted into the through hole. The optical window is inserted into the through hole such that the optical window is closer to the surface for detection with respect to the front-end portion of the optical fiber.

According to this configuration, it is possible to partition outside of a probe body and an internal space of the probe body by an optical window. Therefore, the optical fiber is not exposed to the outside of the probe body, and can be housed in the internal space. Accordingly, it is possible to suppress exposure of an optical fiber to the external environment. Therefore, even in a case where the external environment is a high-temperature and high-pressure environment, it is possible to suppress a front-end portion of the optical fiber from denting from a surface for detection of the probe body. Further, a sealing member for fixing the optical fiber to the probe body can be omitted, and thus damage of the sealing member is not caused. Accordingly, a change of the optical fiber caused by the external environment can be suppressed, so that lowering of detection accuracy can be suppressed.

An optical fiber measuring device according to the present invention includes the optical fiber probe as described above; a light-emitting unit configured to emit light to the optical fiber probe; a light-receiving unit configured to receive light incident from the optical fiber probe; and a measurement controller configured to perform signal processing for a light-emission signal for the light-emitting unit and a light-receiving signal received from the light-receiving unit.

According to this configuration, even in a case of using an optical fiber probe in a harsh external environment, it is possible to suppress lowering of detection accuracy of the optical fiber probe. Therefore, measurement using the optical fiber probe can be performed with high accuracy.

Preferably, the optical fiber includes a plurality of light-transmitting fibers for emitting light from the surface for detection and a plurality of light-receiving fibers for receiving light incident on the surface for detection, the plurality of light-receiving fibers being corresponding respectively to the plurality of light-transmitting fibers; the light-emitting unit makes colors of light beams emitted from the plurality of light-transmitting fibers different from each other; and the light-receiving unit includes a plurality of filters each for selecting a corresponding one of the light beams having different colors.

According to this configuration, in a case where light-transmitting fibers and light-receiving fibers are respectively associated with each other, it is possible to select light by filters of a light-receiving unit even when light emitted from one light-transmitting fiber is incident on another light-receiving fiber that is not associated with the one light-transmitting fiber. Therefore, it is possible to suppress mixing of light in the light-transmitting fibers and the light-receiving fibers (that is, crosstalk), so that false detection of light in the light-receiving unit can be suppressed.

A clearance control system according to the present invention is for adjusting a predetermined clearance in a turbine that includes a casing and a rotor blade provided to face the casing with the clearance. The clearance control system includes the optical fiber measuring device as described above to measure the clearance based on the light-emission signal and the light-receiving signal; and a turbine controller configured to perform clearance adjusting control for adjusting the clearance based on the clearance measured by the optical fiber measuring device.

According to this configuration, even in a case of using an optical fiber probe in a harsh external environment, it is possible to suppress lowering of detection accuracy of the optical fiber probe. Therefore, measurement of a clearance using the optical fiber probe can be performed with high accuracy. Accordingly, clearance adjusting control by a turbine controller can be performed with high accuracy.

DESCRIPTION OF EMBODIMENTS

Embodiments of the present invention will be explained below in detail with reference to the accompanying drawings. The present invention is not limited to these embodiments. Constituent elements in the following embodiments include elements that are replaceable by or easily occur to persons skilled in the art, or substantially the same elements. The constituent elements described in the following embodiments can be combined with one another as appropriate, and when there are a plurality of embodiments, these embodiments can be combined to one another.

First Embodiment

Figure 1:
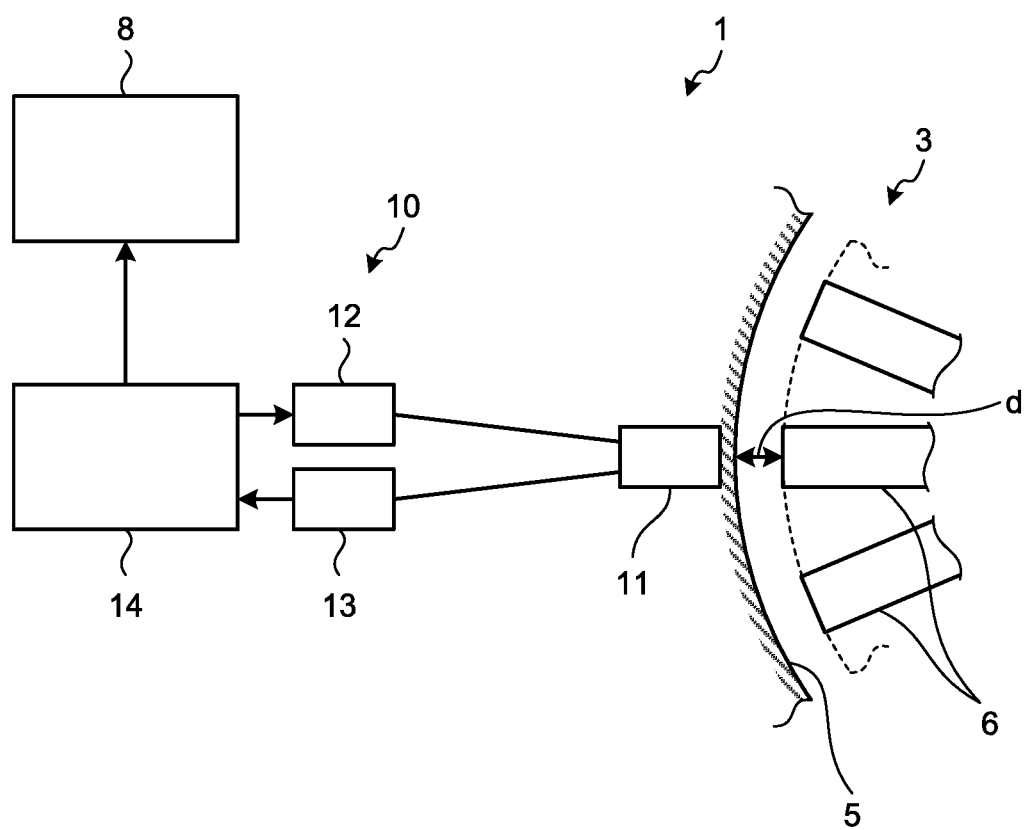
FIG. 1 is a schematic configuration diagram related to a clearance control system according to a first embodiment.
Figure 2:
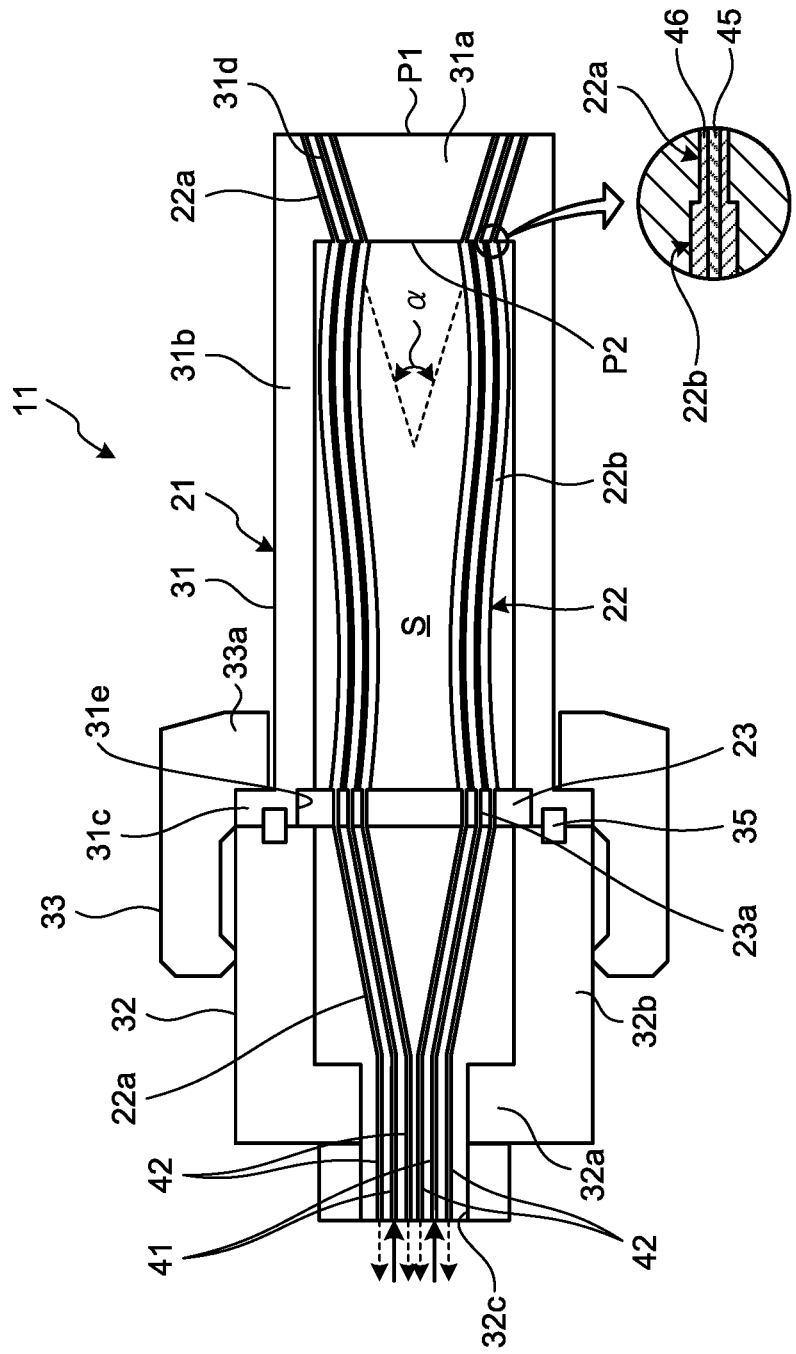
FIG. 2 is a cross-sectional view schematically illustrating an optical fiber probe according to the first embodiment.
Figure 3:
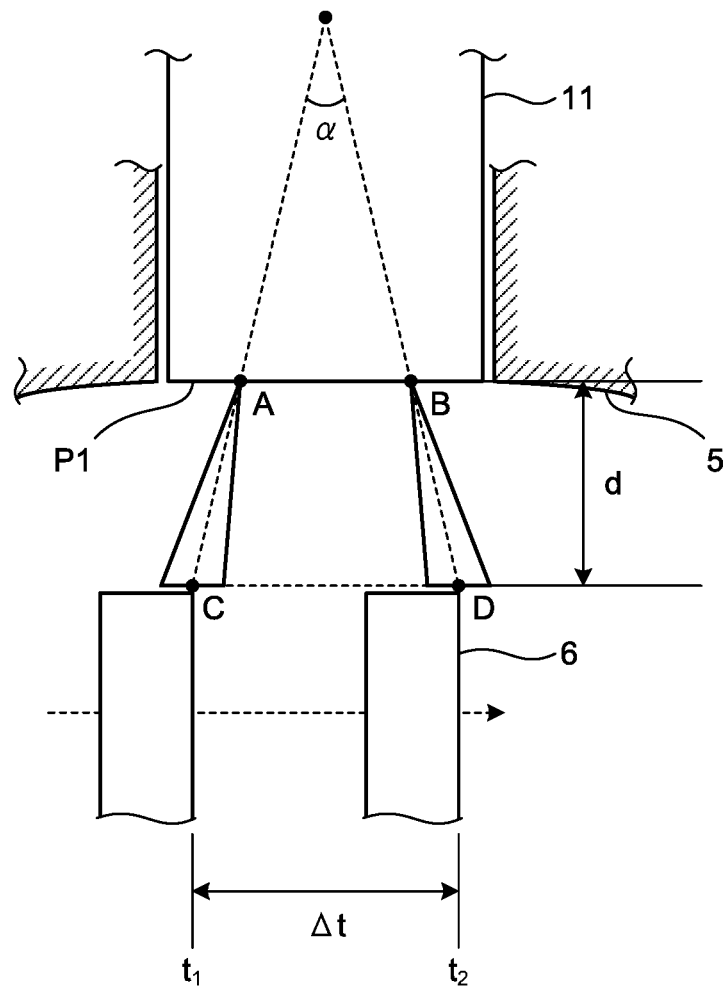
FIG. 3 is an explanatory diagram related to a method of calculating a clearance.
Figure 4:
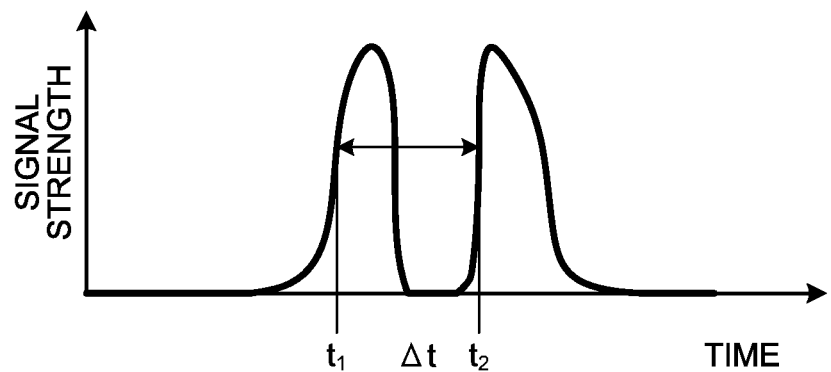
FIG. 4 is a graph related to a signal strength of a light-receiving signal detected by using the optical fiber probe.

FIG. 1 is a schematic configuration diagram related to a clearance control system according to a first embodiment. FIG. 2 is a cross-sectional view schematically illustrating an optical fiber probe according to the first embodiment. FIG. 3 is an explanatory diagram related to a method of calculating a clearance. FIG. 4 is a graph related to a signal strength of a light-receiving signal detected by using the optical fiber probe.

As illustrated in FIG. 1, a clearance control system 1 according to the first embodiment is a system that measures a clearance d formed between a casing 5 of a turbine 3 and a rotor blade 6, and adjusts the clearance d based on a result of the measurement. First, the turbine 3 is described before the clearance control system 1 is described.

The turbine 3 is a turbomachine including a steam turbine or a gas turbine. The turbine 3 includes a plurality of rotor blades 6 provided in a rotor (not illustrated) that serves as a rotation axis, and the casing 5 provided around the rotor blades 6. The rotor blades 6 are attached to the rotor and are arranged with a predetermined gap therebetween in a circumferential direction of the rotor. The casing 5 is provided to face the rotor blades 6 that are arranged in the circumferential direction, and is formed to be annular. The casing 5 is provided to be opposed to the rotor blades 6 with the predetermined clearance d. For example, the casing 5 has a configuration that includes an inner casing and an outer casing provided outside the inner casing.

Next, the clearance control system 1 is described with reference to FIG. 1. The clearance control system 1 includes a turbine controller 8 and an optical fiber measuring device 10. The optical fiber measuring device 10 measures the clearance d.

The turbine controller 8 executes clearance adjusting control for adjusting the clearance d based on the clearance d measured by the optical fiber measuring device 10. As clearances, there is a clearance d in a radial direction of a rotor (a so-called chip clearance) and a clearance in an axial direction of a rotor. FIG. 1 illustrates the clearance d in a radial direction of a rotor.

As clearance adjusting control in the radial direction of the rotor, for example, the turbine controller 8 controls an actuator that moves up and down the casing 5 including an inner casing and an outer casing to adjust the clearance d. The turbine controller 8 also controls an actuator that moves up and down the rotor to adjust the clearance d, for example. Further, for example, the turbine controller 8 controls the temperature of the casing 5 to adjust thermal expansion of the casing 5, thereby adjusting the clearance d.

Furthermore, as clearance adjusting control in the axial direction of the rotor, for example, the turbine controller 8 controls an actuator that moves the casing 5 including an inner casing and an outer casing in the axial direction to adjust the clearance. Further, for example, the turbine controller 8 controls an actuator that moves the rotor in the axial direction to adjust the clearance.

The optical fiber measuring device 10 measures the clearance d between the casing 5 and the rotor blade 6, and includes an optical fiber probe 11, a light-emitting unit 12, a light-receiving unit 13, and a measurement controller 14.

As illustrated in FIG. 1, the optical fiber probe 11 is attached to the casing 5, and is provided in such a manner that a surface for detection P1 of the optical fiber probe 11 faces the rotor blade 6 in the radial direction of the rotor. Therefore, the optical fiber probe 11 is exposed to a high-temperature and high-pressure external environment between the casing 5 and the rotor blades 6. As illustrated in FIG. 2, the optical fiber probe 11 includes a probe body 21, a plurality of optical fibers 22, and a position regulating member 23.

The probe body 21 is constituted to include a front-end side case 31 that is located on the side of the surface for detection P1, a rear-end side case 32 that is provided on a rear end side of the front-end side case 31, and a nut 33 that fixes the front-end side case 31 and the rear-end side case 32 to each other, and has a hollow internal space S formed therein.

The front-end side case 31 includes a bottom plate portion 31a, a cylindrical portion 31b, and a flange portion 31c to form a cylindrical shape with a bottom. An outer surface of the bottom plate portion 31a is the surface for detection P1, and an inner surface is a bottom surface P2. This bottom plate portion 31a has a plurality of through holes 31d in a thickness direction that is a direction in which the surface for detection P1 and the bottom surface P2 are opposed to each other. The through holes 31d causes outside of the probe body 21 and the internal space S of the probe body 21 to communicate with each other. Among the through holes 31d, one group of through holes 31d is formed on one side in the radial portion and the other group of through holes 31d is formed on the other side in the radial portion. A penetrating direction of the through holes 31d of the one group and a penetrating direction of the through holes 31d of the other group are arranged to form a predetermined angle α therebetween. The bottom plate portion 31a is provided on a front end side of the cylindrical portion 31b, and the flange portion 31c is provided in a rear end side of cylindrical portion 31b. The flange portion 31c is formed to project outward in a radial direction of the cylindrical portion 31b. This flange portion 31c serves as a stopper for the nut 33 that is to be fasten. The front-end side case 31 also has a receiving groove 31e in an inner circumferential surface of the flange portion 31c in the entire circumference. The position regulating member 23 is accommodated in this receiving groove 31e.

The rear-end side case 32 includes a bottom plate portion 32a and a cylindrical portion 32b to form a cylindrical shape with a bottom. The bottom plate portion 32a has an insertion hole 32c into which the optical fibers 22 are inserted. The bottom plate portion 32a is provided on a rear end side of the cylindrical portion 32b, and the flange portion 31c of the front-end side case 31 is in contact with a front end side of the cylindrical portion 32b. On an outer circumferential surface on the front end side of the cylindrical portion 32b, an external thread with which the nut 33 is to be screwed is formed.

A pin 35 is provided between the front-end side case 31 and the rear-end side case 32. The pin 35 regulates the positions of the front-end side case 31 and the rear-end side case 32 in the circumferential direction. The pin 35 prevents corotation of the front-end side case 31 and the rear-end side case 32 during screwing of the nut 33 described later.

The nut 33 is formed to be annular, and has an internal thread formed in an inner circumferential surface on one side in the axial direction and a projection 33a that projects from the inner circumferential surface on the other side in the axial direction. The nut 33 is inserted from the front-end side case 31, and the internal thread of the nut 33 and the external thread of the rear-end side case 32 are screwed with each other. Further, the position of the nut 33 is regulated by contact of the projection 33a thereof with the flange portion 31c of the front-end side case 31.

The optical fibers 22 are housed in the internal space S of the probe body 21, and include a plurality of light-transmitting fibers 41 and a plurality of light-receiving fibers 42. Specifically, two light-transmitting fibers 41 are provided, where one of which is provided on one side (an upper side in FIG. 2) in the hollow internal space S and the other one is provided on the other side (a lower side in FIG. 2). The light-receiving fibers 42 include ones provided concentrically around the one light-transmitting fiber 41 as a center, and ones provided concentrically around the other light-transmitting fiber 41 as a center. In this manner, the optical fibers 22 are provided while being divided into one group of the optical fibers 22 and the other group of the optical fibers 22.

Each optical fiber 22 is configured to include small-diameter portions 22a having a smaller diameter and a large-diameter portion 22b having a larger diameter. The small-diameter portion 22a is provided in a front-end portion of the optical fiber 22, which is a portion close to the surface for detection P1. The large-diameter portion 22b is provided on a rear-end side of the small-diameter portion 22b, and the small-diameter portion 22a is provided on a rear-end side of the large-diameter portion 22b. That is, the large-diameter portion 22b is provided between the two small-diameter portions 22a. This optical fiber 22 includes a core 45 that is a central portion and a cladding 46 provided around the core 45. The core 45 has the same diameter in the entire length of the optical fiber 22. That is, the diameter of the core 45 in the small-diameter portions 22a of the optical fiber 22 and that in the large-diameter portion 22b are the same as each other. Meanwhile, the cladding 46 has a larger outer diameter in the large-diameter portion 22b than that in the small-diameter portions 22a.

The position regulating member 23 is formed in a circular plate shape, and divides the internal space S of the probe body 21 into two portions by being accommodated in the receiving groove 31e of the front-end side case 31. The position regulating member 23 has a plurality of insertion holes 23a penetrating therethrough, into which the small-diameter portions 22a of the optical fibers 22 are inserted. The insertion holes 23a include ones formed to correspond to the optical fibers 22 of the one group and ones formed to correspond to the optical fibers 22 of the other group.

In the optical fiber 22 described above, the small-diameter portion 22a on the front end side is inserted into the through hole 31d of the probe body 21, and the small-diameter portion 22a on the rear end side is inserted into the insertion hole 23a of the position regulating member 23. In the optical fiber 22, the large-diameter portion 22b is provided in the internal space S between the bottom surface P2 and the position regulating member 23 while being bent. That is, the large-diameter portion 22b is formed to be longer than a length between the bottom surface P2 of the probe body 21 and the position regulating member 23. The large-diameter portion 22b is provided in such a manner that a front-end side portion thereof is in contact with the bottom surface P2 of the probe body 21 and a rear-end side portion thereof is bent by being in contact with the position regulating member 23.

The light-emitting unit 12 is connected to each of the two light-transmitting fibers 41 of the optical fiber probe 11, and emits light based on a light-emission signal of the measurement controller 14. The light emitted from the light-transmitting fiber 41 is radiated to the rotor blade 6, and reflected light from the rotor blade 6 is incident on the surface for detection P1 of the probe body 21.

The light-receiving unit 13 is connected to each of the light-receiving fibers 42 of the optical fiber probe 11, and receives reflected light incident on the surface for detection P1 of the probe body 21 and outputs a light-receiving signal to the measurement controller 14.

The measurement controller 14 is connected to each of the light-emitting unit 12 and the light-receiving unit 13, and outputs a light-emission signal to the light-emitting unit 12. Also, a light-receiving signal output from the light-receiving unit 13 is input to the measurement controller 14. Further, the measurement controller 14 is connected to the turbine controller 8, and performs signal processing for the light-transmission signal and the light-receiving signal to measure the clearance d and outputs the measured clearance d to the turbine controller 8.

A method of calculating the clearance d by the measurement controller 14 is described here with reference to FIGS. 3 and 4. The measurement controller 14 calculates the clearance d based on the following Equation (1).

$$d = \frac{\frac{1}{2}\overline{CD}}{\tan\frac{\alpha}{2}} - \frac{\frac{1}{2}\overline{AB}}{\tan\frac{\alpha}{2}} = \frac{\frac{1}{2} \times 2\pi R \times \frac{\Delta t}{T}}{\tan\frac{\alpha}{2}} - \frac{\frac{1}{2}L}{\tan\frac{\alpha}{2}} \quad (1)$$

Here, the angle α is an angle formed by light-guiding directions of two light beams emitted from the two light-transmitting fibers 41, that is, an angle α formed by a penetrating direction of the through holes 31d of one group and a penetrating direction of the through holes 31d of the other group. The angle α is a known angle. A distance L is a distance between A and B, that is, a distance between the two light-transmitting fibers 41 and is a known distance. A circumferential length 2πR is a circumferential length in an outer circumference of the rotor blades 6 and is a known circumferential length. A time T is a time required for one round (one revolution) and is obtained based on a rotational speed of a rotor. That is, "2πR/T" is a circumferential speed in the outer circumference of the rotor blades 6. A time Δt is a time during which a rotor blade 6 passes between the two light-transmitting fibers 41 and is obtained based on a light-receiving signal.

As the light-receiving signal, the measurement controller 14 acquires a light-receiving signal illustrated in FIG. 4. In FIG. 4, the horizontal axis represents a time and the vertical axis represents a signal strength. As illustrated in FIG. 4, two signal peaks are detected in the light-receiving signal. The two signal peaks are obtained by two light beams emitted from the two light-transmitting fibers 41. The measurement controller 14 then acquires a time from one signal peak to the other signal peak as the time Δt. Upon acquiring the time at based on the light-receiving signal, the measurement controller 14 calculates the clearance d based on Equation (1).

As described above, according to the first embodiment, by providing the large-diameter portion 22b of the optical fiber 22 in the internal space S while being bent, it is possible to arrange the large-diameter portion 22b to be pressed against the bottom surface P2 of the internal space S. Therefore, even in a case where the external environment is a high-temperature and high-pressure environment, it is possible to suppress the small-diameter portion 22a of the optical fiber 22 from denting from the surface for detection P1 of the probe body 21. Further, a sealing member for fixing the optical fiber 22 to the probe body 21 can be omitted, and thus damage of the sealing member is not caused. Accordingly, a change of the optical fiber 22 caused by the external environment can be suppressed, so that lowering of detection accuracy can be suppressed.

Further, according to the first embodiment, the diameter of the core 45 of the optical fiber 22 can be made the same in the small-diameter portion 22a and in the large-diameter portion 22b. Therefore, it is possible to maintain an interface between the core 45 and the cladding 46 in a uniform state. Further, it is possible to easily form the large-diameter portion 22b by making the outer diameter of the cladding 46 thick.

Furthermore, according to the first embodiment, even in a case of providing the optical fiber probe 11 in a harsh external environment, lowering of detection accuracy of the optical fiber probe 11 can be suppressed. Therefore, it is possible to perform measurement of the clearance d using the optical fiber measuring device 10 with high accuracy.

According to the first embodiment, it is possible to perform measurement of the clearance d by using the optical fiber measuring device 10 with high accuracy. Therefore, the clearance control system 1 can adjust the clearance d between the casing 5 and the rotor blade 6 with high accuracy and can improve turbine efficiency.

Figure 5:
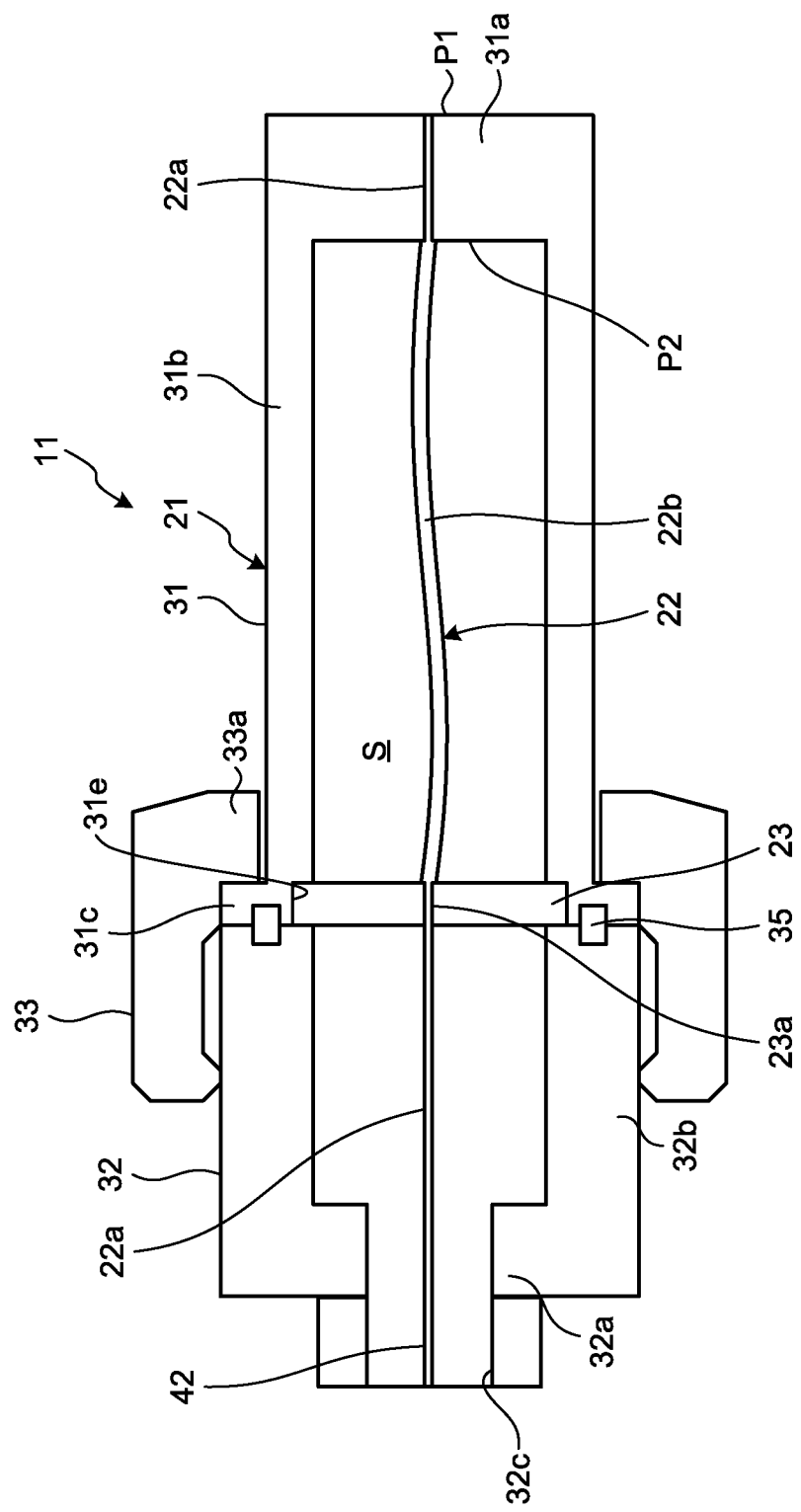
FIG. 5 is a cross-sectional view schematically illustrating an optical fiber probe according to a first modification of the first embodiment.

While the optical fiber probe 11 according to the first embodiment is applied to the optical fiber measuring device 10 used in the clearance control system 1, the optical fiber probe 11 is not limited this configuration. That is, in the first embodiment, two light-transmitting fibers 41 are used for measuring the clearance d. However, for example, the optical fiber probe can be that described in a first modification illustrated in FIG. 5. FIG. 5 is a cross-sectional view schematically illustrating an optical fiber probe according to the first modification of the first embodiment. As illustrated in FIG. 5, a configuration including only one optical fiber 22 can be employed.

Further, while the optical fiber measuring device 10 according to the first embodiment is used for measuring the clearance d between the casing 5 and the rotor blade 6, the optical fiber measuring device 10 is not limited to this configuration. For example, the optical fiber measuring device 10 can be used for measuring a clearance between a stator blade provided in the turbine 3 and a rotor. In this case, for example, it is preferable that the turbine controller 8 controls active clearance control (ACC) to adjust the clearance d. The active clearance control is a control method in which a seal portion provided between a stator blade and a rotor is moved in a radial direction of a rotor in order to adjust a clearance.

Further, while the large-diameter portion 22b of the optical fiber 22 according to the first embodiment is formed by making the outer diameter of the cladding 46 thick, the large-diameter portion 22b can be formed by providing a separate coating member around the optical fiber 22 that is the small-diameter portion 22a in the entire length.

Second Embodiment

Figure 6:
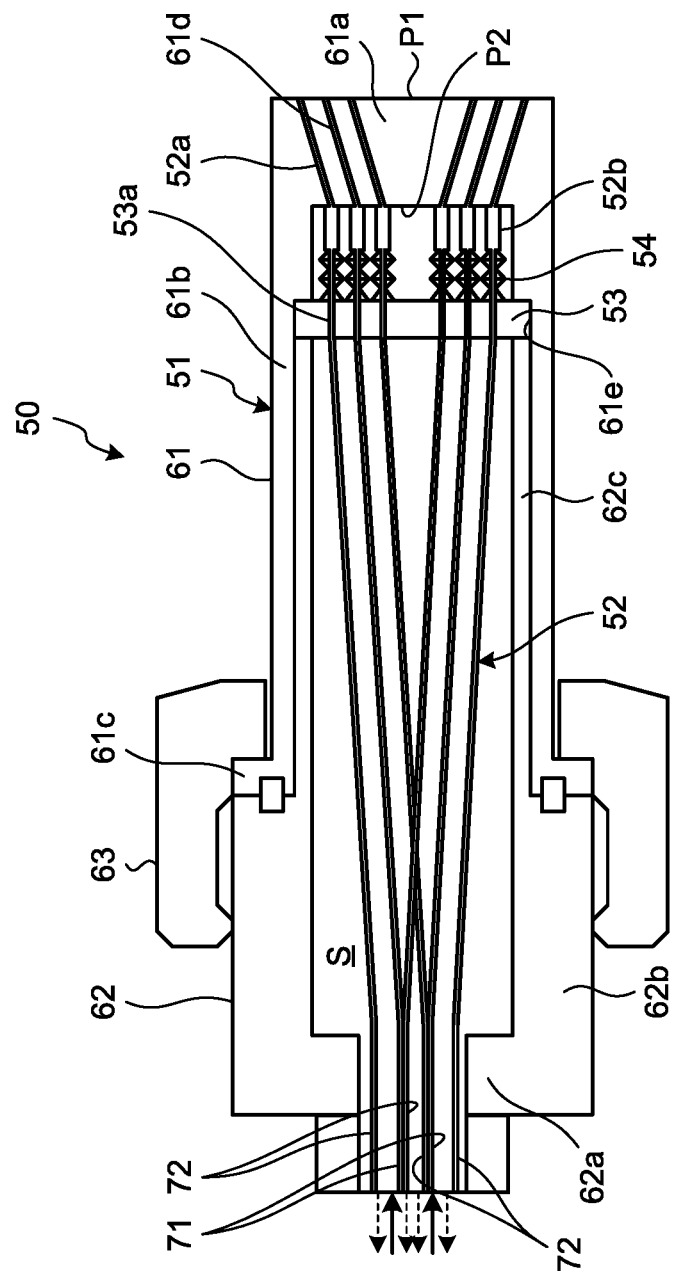
FIG. 6 is a cross-sectional view schematically illustrating an optical fiber probe according to a second embodiment.

Next, an optical fiber probe according to a second embodiment is described with reference to FIG. 6. FIG. 6 is a cross-sectional view schematically illustrating the optical fiber probe according to the second embodiment. In the second embodiment, in order to avoid redundant descriptions, elements different from those of the first embodiment are described, and elements having configurations identical to those of the first embodiment are described while denoting them with like reference signs.

As illustrated in FIG. 6, an optical fiber probe 50 according to the second embodiment includes a probe body 51, a plurality of optical fibers 52, a position regulating member 53, and an elastic member 54.

The probe body 51 is configured to include a front-end side case 61 that is located on the side of the surface for detection P1, a rear-end side case 62 that is provided on a rear end side of the front-end side case 61, and a nut 63 that fixes the front-end side case 61 and the rear-end side case 62 to each other, and has the hollow internal space S formed therein.

The front-end side case 61 is substantially identical to the front-end side case 31 according to the first embodiment, and includes a bottom plate portion 61a, a cylindrical portion 61b, a flange portion 61c, through holes 61d, and a receiving groove 61e to form a cylindrical shape with a bottom. In the front-end side case 61, the receiving groove 61e is formed more toward the bottom surface P2 as compared with the first embodiment.

The rear-end side case 62 is substantially identical to the rear-end side case 32 according to the first embodiment, and includes a bottom plate portion 62a and a cylindrical portion 62b to form a cylindrical shape with a bottom. Also, in the rear-end side case 62, a small-diameter cylindrical portion 62c is provided on a front end side of the cylindrical portion 62b. This small-diameter cylindrical portion 62c is accommodated in the receiving groove 61e of the front-end side case 61, and regulates the position of the position regulating member 53. The nut 63 is identical to the nut 33 according to the first embodiment, and thus descriptions thereof will be omitted.

The optical fibers 52 are housed in the internal space S of the probe body 51, and, similarly to the first embodiment, include a plurality of light-transmitting fibers 71 and a plurality of light-receiving fibers 72.

Each optical fiber 52 is configured to include a small-diameter portion 52a having a smaller diameter and a large-diameter portion 52b having a larger diameter, similarly to the first embodiment. The large-diameter portion 52b is formed to be shorter as compared with that of the first embodiment.

The position regulating member 53 is identical to that of the first embodiment, is formed in a circular plate shape, and is accommodated in a portion of the receiving groove 61e of the front-end side case 61, the portion being close to the bottom surface P2.

In the optical fiber 52 described above, the small-diameter portion 52a on the front end side is inserted into the through hole 61d of the probe body 51, and the small-diameter portion 52a on the rear end side is inserted into an insertion hole 53a of the position regulating member 53. Further, in the optical fiber 52, the large-diameter portion 52b is formed to be shorter than a length between the bottom surface P2 of the probe body 51 and the position regulating member 53. The large-diameter portion 52b is provided in such a manner that a front-end portion thereof is in contact with the bottom surface P2 of the probe body 51 and a rear-end portion thereof is spaced away from the position regulating member 53 with a predetermined gap therebetween.

The elastic member 54 is provided in the gap between the rear-end portion of the large-diameter portion 52b of the optical fiber 52 and the position regulating member 53. A plurality of elastic members 54 are provided as the number of which corresponds to the number of the optical fibers 52. For example, a disc spring is used as the elastic member 54.

The elastic member 54 presses the large-diameter portion 52b of the optical fiber 52 and the position regulating member 53, thereby pressing the optical fiber 52 towards the surface for detection P1.

As described above, according to the second embodiment, by providing the elastic member 54 between a rear-end portion of the large-diameter portion 52b of the optical fiber 52 and the position regulating member 53, it is possible to configure that the elastic member 54 presses the optical fiber 52 toward the surface for detection P1, and therefore it is possible to press the large-diameter portion 52b against the bottom surface P2 of the internal space S. Accordingly, even in a case where the external environment is a high-temperature and high-pressure environment, it is possible to suppress the small-diameter portion 52a of the optical fiber 52 from denting from the surface for detection P1 of the probe body 51. Further, a sealing member for fixing the optical fiber 52 to the probe body 51 can be omitted, and thus damage of the sealing member is not caused. Accordingly, a change of the optical fiber 52 caused by the external environment can be suppressed, so that lowering of detection accuracy can be suppressed.

Figure 7:
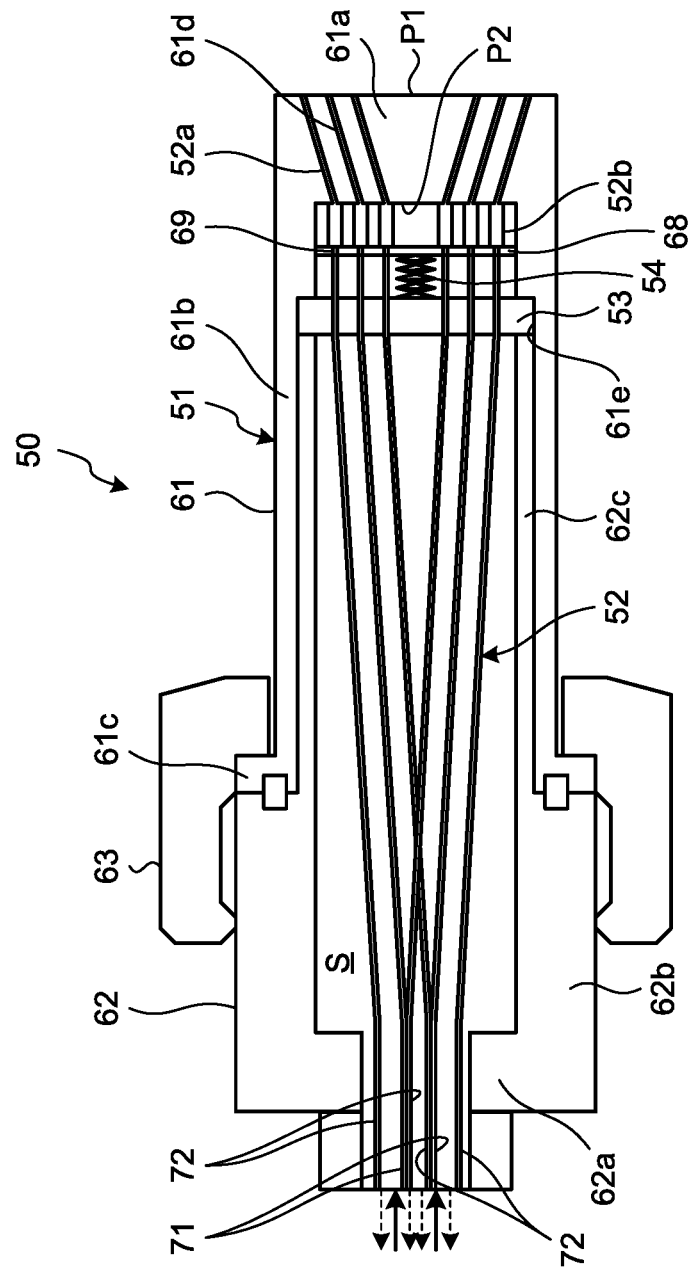
FIG. 7 is a cross-sectional view schematically illustrating an optical fiber probe according to a second modification of the second embodiment.

While the optical fiber probe 50 according to the second embodiment has the elastic member 54 provided between the large-diameter portion 52b of the optical fiber 52 and the position regulating member 53, the optical fiber probe 50 can be that described in a second modification illustrated in FIG. 7. FIG. 7 is a cross-sectional view schematically illustrating an optical fiber probe according to the second modification of the second embodiment. As illustrated in FIG. 7, an intermediate plate 68 in a circular plate shape is provided between the large-diameter portion 52b of the optical fiber 52 and the elastic member 54. One elastic member 54 is provided between the intermediate plate 68 and the position regulating member 53. The intermediate plate 68 has a plurality of insertion holes 69 into which the small-diameter portions 52a on a rear end side of the optical fibers 52 are inserted.

According to this configuration, the elastic member 54 can press the intermediate plate 68, and thus the elastic member 54 can press all the large-diameter portions 52b of the optical fibers 52 via the intermediate plate 68. Therefore, it is unnecessary to prepare a plurality of elastic members 54 the number of which corresponds to the number of the optical fibers 52, and it is also possible to make the size of the elastic member 54 large.

Third Embodiment

Figure 8:
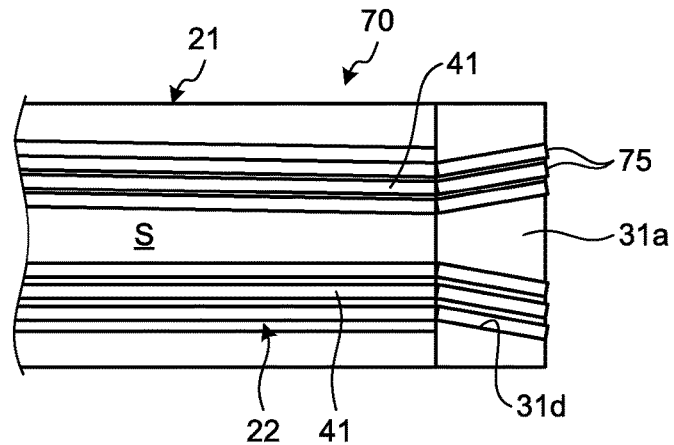
FIG. 8 is a cross-sectional view schematically illustrating an optical fiber probe according to a third embodiment.

Next, an optical fiber probe according to a third embodiment is described with reference to FIG. 8. FIG. 8 is a cross-sectional view schematically illustrating the optical fiber probe according to the third embodiment. In the third embodiment, in order to avoid redundant descriptions, elements different from those of the first and second embodiments are described, and elements having configurations identical to those of the first and second embodiments are described while denoting them with like reference signs.

As illustrated in FIG. 8, an optical fiber probe 70 according to the third embodiment further includes optical windows 75 that are inserted into the through holes 31d and 61d of the probe bodies 21 and 51 in the optical fiber probes 11 and 50 according to the first and second embodiments. The following descriptions are provided assuming that this configuration is applied to the first embodiment.

The optical window 75 is formed to be columnar (formed in a rod shape) by using sapphire glass or quartz glass, for example, and is inserted into and fixed to the through hole 31d by brazing or press fitting. An outer circumferential surface of the optical window 75 is plated to improve the reflectance of light in the optical window 75. A front-end portion of the optical fiber 22 is in contact with a rear-end side portion of the optical window 75.

A front-end portion of the light-transmitting fiber 41 of the optical fiber 22 is subjected to scattering processing, and light emitted from the light-transmitting fiber 41 is scattered and is incident on the optical window 75. The through hole 31d into which the optical window 75 is inserted is formed to have a predetermined shape in such a manner that emitted light has a predetermined angle of emission and a predetermined diffusion angle. Further, a front-end portion including the bottom plate portion 31a of the probe body 21 to which the optical window 75 is fixed is formed by using Kovar, for example, so as to make the thermal expansion coefficient of the front-end portion close to that of the optical window 75.

As described above, according to the third embodiment, it is possible to partition the outside of the probe body 21 and the internal space S of the probe body 21 by the optical window 75. Therefore, the optical fiber 22 is not exposed to the outside of the probe body 21 and the optical fiber 22 can be housed in the internal space S. Accordingly, it is possible to suppress exposure of the optical fiber 22 to the external environment.

While the third embodiment has been described while being applied to the first and second embodiments, the third embodiment is not limited to the above configuration. The optical fiber 22 can have a configuration in which the large-diameter portion 22b is omitted, and the optical fiber 22 can be the small-diameter portion 22a in its entire length.

Fourth Embodiment

Figure 9:
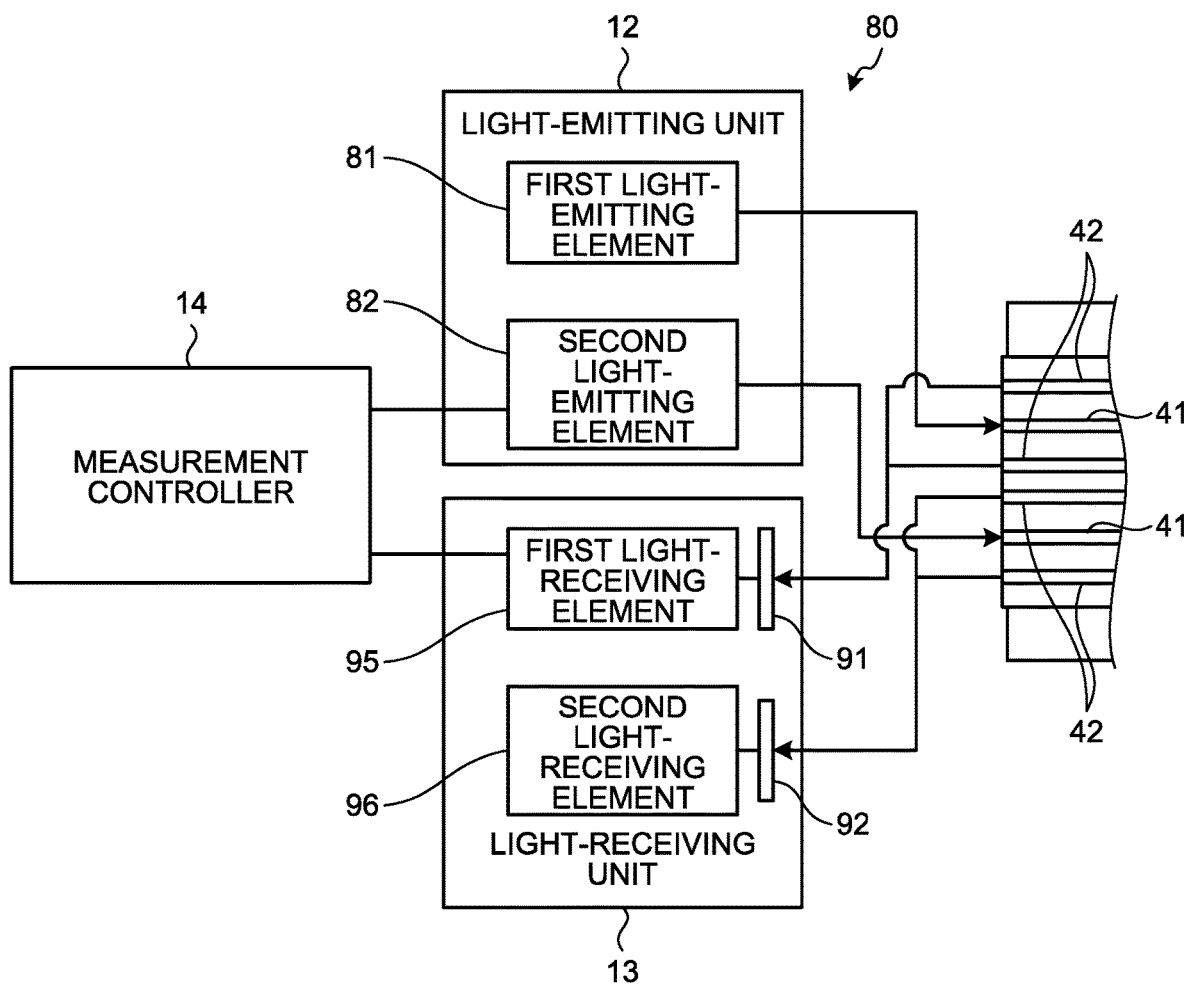
FIG. 9 is a schematic configuration diagram schematically illustrating an optical fiber measuring device according to a fourth embodiment.

Next, an optical fiber measuring device 80 according to a fourth embodiment is described with reference to FIG. 9. FIG. 9 is a schematic configuration diagram schematically illustrating the optical fiber measuring device according to the fourth embodiment. In the fourth embodiment, in order to avoid redundant descriptions, elements different from those of the first to third embodiments are described, and elements having configurations identical to those of the first to third embodiments are described while denoting them with like reference signs.

As illustrated in FIG. 9, in the optical fiber measuring device 80 according to the fourth embodiment, light beams emitted from two light-transmitting fibers 41 have different colors from each other. That is, the light-emitting unit 12 includes a first light-emitting element 81 that emits light with a first color and a second light-emitting element 82 that emits light with a second color. One of the light-transmitting fibers 41 is connected to the first light-emitting element 81, and the other light-transmitting fiber 41 is connected to the second light-emitting element 82.

The light-receiving unit 13 includes a first bandpass filter 91 that only allows light with the first color to pass therethrough, a first light-receiving element 95 that receives light having passed through the first bandpass filter 91, a second bandpass filter 92 that only allows light with the second color to pass therethrough, and a second light-receiving element 96 that receives light having passed through the second bandpass filter 92. To the first light-receiving element 95, one group of the light-receiving fibers 42 provided around one of the light-transmitting fibers 41 is connected. To the second light-receiving element 96, the other group of the light-receiving fibers 42 provided around the other light-transmitting fiber 41 is connected.

In the optical fiber measuring device 80, light with the first color and light with the second color are emitted from the light-emitting unit 12 to the two light-transmitting fibers 41. The light with the first color emitted from one of the light-transmitting fibers 41 is radiated to the rotor blade 6, and reflected light from the rotor blade 6 is incident on the surface for detection P1 of the probe body 21. The light with the second color emitted from the other light-transmitting fiber 41 is radiated to the rotor blade 6, and reflected light from the rotor blade 6 is incident on the surface for detection P1 of the probe body 21.

The light-receiving unit 13 only receives reflected light with the first color among reflected light incident from the surface for detection P1 of the probe body 21 via the one group of light-receiving fibers 42, on the first light-receiving element 95 via the first bandpass filter 91. Further, the light-receiving unit 13 only receives reflected light with the second color among reflected light incident from the surface for detection P1 of the probe body 21 via the other group of light-receiving fibers 42, on the second light-receiving element 96 via the second bandpass filter 92.

As described above, according to the fourth embodiment, even in a case where light with the first color emitted from one of the light-transmitting fibers 41 is incident on the light-receiving fibers 42 of the other group, it is possible to only allow light with the second color to pass through the second bandpass filter 92 of the light-receiving unit 13. Similarly, even in a case where light with the second color emitted from the other light-transmitting fiber 41 is incident on the light-receiving fibers 42 of one group, it is possible to only allow light with the first color to pass through the first bandpass filter 91 of the light-receiving unit 13. The light-receiving unit 13 can select light to be received in this manner. Therefore, it is possible to suppress mixing of light in the light-transmitting fibers 41 and the light-receiving fibers 42 (that is, crosstalk), so that false detection of light in the light-receiving unit 13 can be suppressed.

REFERENCE SIGNS LIST 1 clearance control system
3 turbine
5 casing
6 rotor blade
8 turbine controller
10 optical fiber measuring device
11 optical fiber probe
12 light-emitting unit
13 light-receiving unit
14 measurement controller
21 probe body
22 optical fiber
22a small-diameter portion
22b large-diameter portion
23 position regulating member
23a insertion hole
31 front-end side case
31a bottom plate portion
31b cylindrical portion
31c flange portion
31d through hole
31e receiving groove
32 rear-end side case
32a bottom plate portion
32b cylindrical portion
32c insertion hole
33 nut
33a projection
35 pin
41 light-transmitting fiber
42 light-receiving fiber
45 core
46 cladding
50 optical fiber probe (second embodiment)
51 probe body
52 optical fiber
53 position regulating member
54 elastic member
61 front-end side case
61a bottom plate portion
61b cylindrical portion
61c flange portion
61d through hole
61e receiving groove
62 rear-end side case
62a bottom plate portion
62b cylindrical portion
62c small-diameter cylindrical portion
63 nut
68 intermediate plate
70 optical fiber probe (third embodiment)
75 optical window
80 optical fiber measuring device (fourth embodiment)
81 first light-emitting element
82 second light-emitting element
91 first bandpass filter
92 second bandpass filter
95 first light-receiving element
96 second light-receiving element
d clearance
α angle
P1 surface for detection
P2 bottom surface
S internal space

The invention claimed is:

1. An optical fiber probe used under high-temperature and high-pressure environment, comprising:
a probe body having a first bottom plate portion with a surface for detection provided in an outer surface thereof, a second bottom plate portion provided on an opposite side to the first bottom portion, and an internal space formed therein;
an optical fiber housed in the internal space such that a front-end portion thereof is provided closer to the first bottom plate portion of the probe body; and
a position regulating member attached to the probe body to partition the internal space into a space closer to the first bottom plate portion and a space closer to the second bottom plate portion, wherein
the optical fiber includes a small-diameter portion and a large-diameter portion connected with the small-diameter portion in the space closer to the first bottom plate portion, the large-diameter portion having a diameter larger than an diameter of the small-diameter portion,
the first bottom plate portion of the probe body has an inner surface in the internal space, and a through hole for communicating the surface for detection and the inner surface,
the small-diameter portion is inserted into the through hole,
the large-diameter portion is arranged such that a first end face thereof closer to the small-diameter portion is in contact with the inner surface of the first bottom plate portion while being bent in the space closer to the first bottom plate portion, and the position regulating member is provided to contact a second end face of the large-diameter portion, and regulates a position of the optical fiber with the large-diameter portion being bent.

2. The optical fiber probe according to claim 1, wherein
the optical fiber includes a core as being a central portion and a cladding provided around the core,
the core has a same diameter in the large-diameter portion and in the small-diameter portion, and
the cladding has a larger outer diameter in the large-diameter portion than in the small-diameter portion.

3. The optical fiber probe according to claim 1, further comprising an optical window inserted into the through hole such that the optical window is closer to the surface for detection.

4. The optical fiber probe according to claim 3, wherein
the optical window has a columnar shape that is long in an axial direction that is an insertion direction of the through hole, and
an outer circumferential surface of the optical window is plated.

5. An optical fiber measuring device comprising:
the optical fiber probe according to claim 1;
a light-emitting unit configured to emit light to the optical fiber probe;
a light-receiving unit configured to receive light incident from the optical fiber probe; and
a measurement controller configured to perform signal processing for a light-emission signal for the light-emitting unit and a light-receiving signal received from the light-receiving unit.

6. The optical fiber measuring device according to claim 5, wherein
the optical fiber includes a plurality of light-transmitting fibers for emitting light from the surface for detection and a plurality of light-receiving fibers for receiving light incident on the surface for detection, the plurality of light-receiving fibers being corresponding respectively to the plurality of light-transmitting fibers,
the light-emitting unit makes colors of light beams emitted from the plurality of light-transmitting fibers different from each other, and
the light-receiving unit includes a plurality of filters each for selecting a corresponding one of the light beams having different colors.

7. A clearance control system for adjusting a clearance in a turbine that includes a casing and a rotor blade spaced from the casing with the clearance, the clearance control system comprising:
the optical fiber measuring device according to claim 5 to measure the clearance based on the light-emission signal and the light-receiving signal; and
a turbine controller configured to perform clearance adjusting control for adjusting the clearance based on the clearance measured by the optical fiber measuring device.

8. An optical fiber probe comprising:
a probe body having a first bottom plate portion with a surface for detection provided in an outer surface thereof, a second bottom plate portion provided on an opposite side to the first bottom portion, and an internal space formed therein;

an optical fiber housed in the internal space such that a front-end portion thereof is provided closer to the first bottom plate portion of the probe body;
a position regulating member attached to the probe body; and
an elastic member for pressing the optical fiber toward the first bottom plate portion, wherein
the optical fiber includes a small-diameter portion and a large-diameter portion connected with the small-diameter portion in the space closer to the first bottom plate portion, the large-diameter portion having a diameter larger than a diameter of the small-diameter portion,
the first bottom plate portion of the probe body has an inner surface in the internal space, and a through hole for communicating the surface for detection and the inner surface,
the small-diameter portion is inserted into the through hole,
the large-diameter portion is arranged such that a first end face thereof closer to the small-diameter portion is in contact with the inner surface of the first bottom plate portion while being bent in the space closer to the first bottom plate portion,
the position regulating member is spaced from a second end face of the large-diameter portion opposite to the first end face with a gap, and
the elastic member is provided in the gap between the second end face of the large-diameter portion and the position regulating member.

9. The optical fiber probe according to claim 8, wherein
the optical fiber includes a core as being a central portion and a cladding provided around the core,
the core has a same diameter in the large-diameter portion and in the small-diameter portion, and
the cladding has a larger outer diameter in the large-diameter portion than in the small-diameter portion.

10. The optical fiber probe according to claim 8, further comprising an optical window inserted into the through hole such that the optical window is closer to the surface for detection.

11. The optical fiber probe according to claim 10, wherein
the optical window has a columnar shape that is long in an axial direction that is an insertion direction of the through hole, and
an outer circumferential surface of the optical window is plated.

12. An optical fiber measuring device comprising:
the optical fiber probe according to claim 8;
a light-emitting unit configured to emit light to the optical fiber probe;
a light-receiving unit configured to receive light incident from the optical fiber probe; and
a measurement controller configured to perform signal processing for a light-emission signal for the light-emitting unit and a light-receiving signal received from the light-receiving unit.

13. The optical fiber measuring device according to claim 12, wherein
the optical fiber includes a plurality of light-transmitting fibers for emitting light from the surface for detection and a plurality of light-receiving fibers for receiving light incident on the surface for detection, the plurality of light-receiving fibers being corresponding respectively to the plurality of light-transmitting fibers,
the light-emitting unit makes colors of light beams emitted from the plurality of light-transmitting fibers different from each other, and the light-receiving unit includes a plurality of filters each for selecting a corresponding one of the light beams having different colors.

14. A clearance control system for adjusting a clearance in a turbine that includes a casing and a rotor blade spaced from the casing with the clearance, the clearance control system comprising:

the optical fiber measuring device according to claim 12 to measure the clearance based on the light-emission signal and the light-receiving signal; and a turbine controller configured to perform clearance adjusting control for adjusting the clearance based on the clearance measured by the optical fiber measuring device.

\* \* \* \* \*